E. V. CROWELL.
GAS ENERGY CONTROL HEAD FOR OIL WELLS.
APPLICATION FILED AUG. 30, 1919.
1,354,027.
Patented Sept. 28, 1920.
2 SHEETS—SHEET 2.
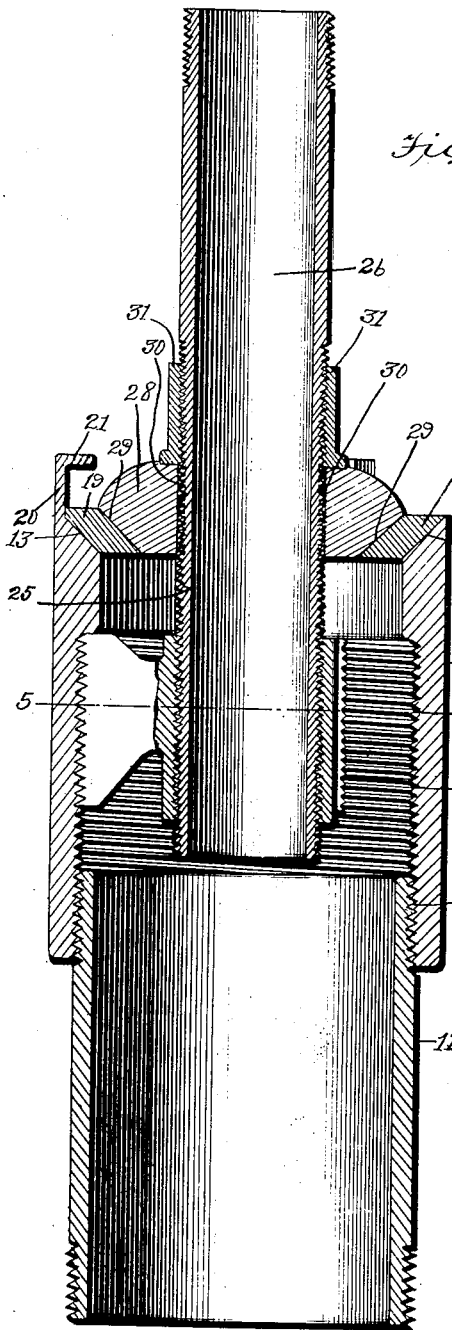
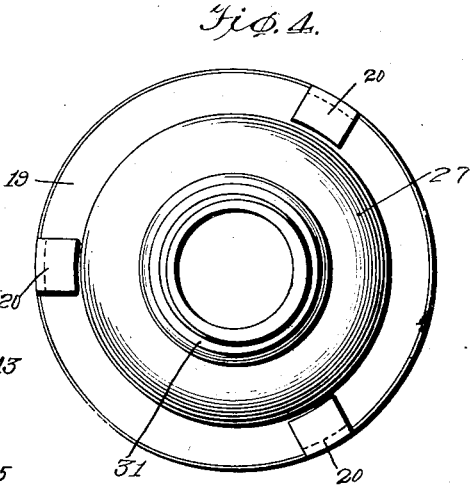
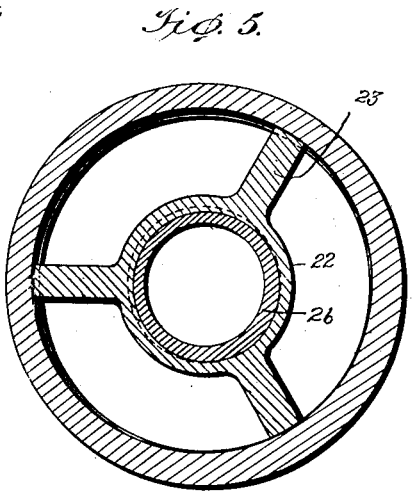
WITNESSES
R. E. Rousseau
INVENTOR
E. V. Crowell,
BY
ATTORNEYS E. V. CROWELL.
GAS ENERGY CONTROL HEAD FOR OIL WELLS.
APPLICATION FILED AUG. 30, 1919.
1,354,027.
Patented Sept. 28, 1920.
2 SHEETS—SHEET 1.
Fig. 1.
Fig. 2.
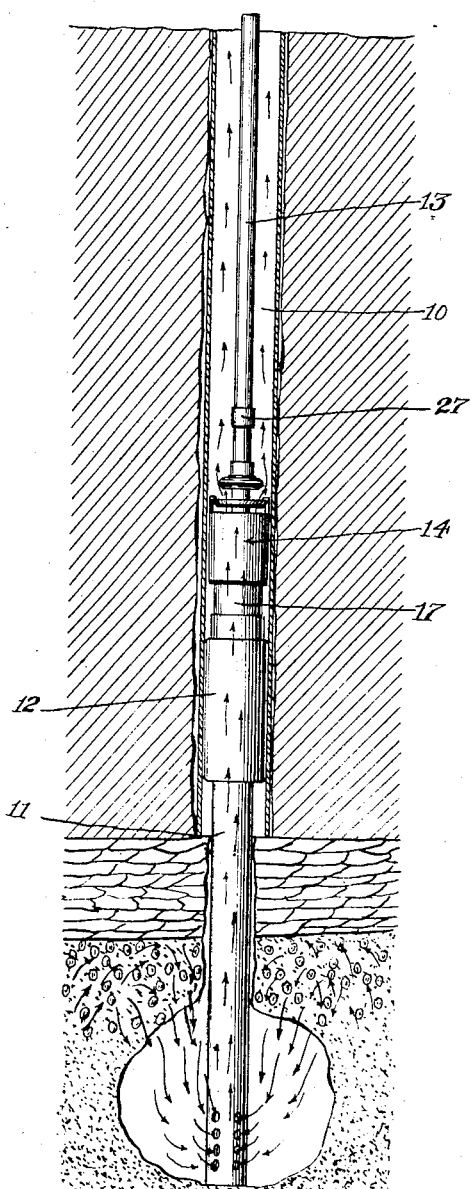
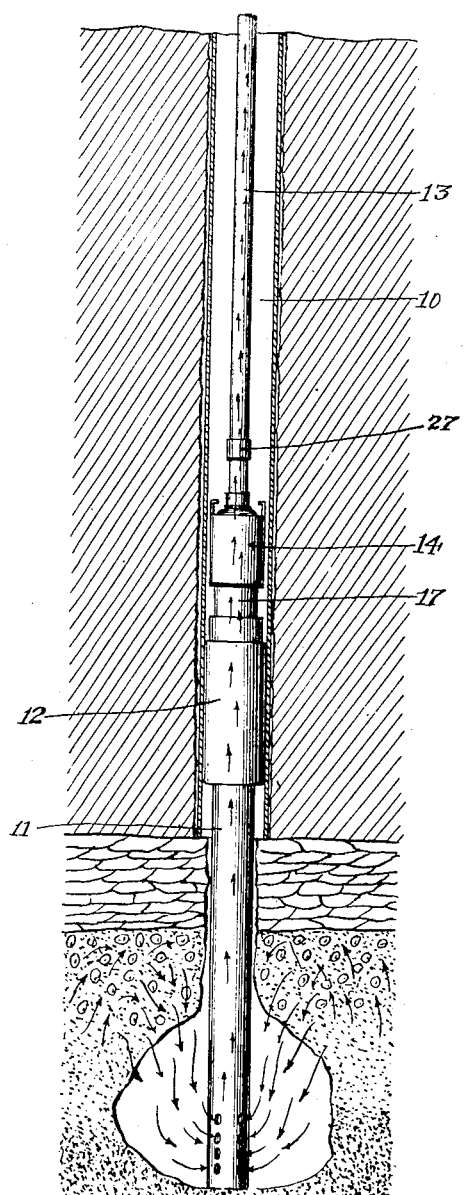
WITNESSES
R. E. Rousseau
INVENTOR
E V Crowell,
BY
ATTORNEYS

UNITED STATES PATENT OFFICE.

ERD V. CROWELL, OF TULSA, OKLAHOMA.

GAS-ENERGY-CONTROL HEAD FOR OIL-WELLS.

1,354,027.   Specification of Letters Patent.   Patented Sept. 28, 1920.

Application filed August 30, 1919. Serial No. 320,870.

*To all whom it may concern:*

Be it known that I, ERD V. CROWELL, a citizen of the United States, and a resident of Tulsa, in the county of Tulsa and State of Oklahoma, have invented new and useful Improvements in Gas-Energy-Control Heads for Oil-Wells, of which the following is a specification.

My invention relates to a gas energy control head for use in connection with oil wells, for utilizing in the most efficient manner the gas energy contained in or present with the oil.

Crude oil is a mixture of bituminous hydrocarbons; liquids, solids and gases, the solids and gases being soluble in the liquids. The liquefication of the combined elements, and degree of solubility are determined mainly by pressure.

Both natural gas and oil are generally found in the same sand, both are of a common origin, the gas being merely a volatile, component of the oil, dissolved in the oil under pressure. The gas, when found associated with the oil, under pressure, imparts a motive energy to the oil, which motive energy tends to make the oil accessible to recovery, by prompting its movement toward the well.

The gas, being so much more mobile than the oil, has the disposition and aptitude to by-pass the oil, and the oil has the disposition to voluntarily give up the dissolved gas; become deënergized, and lie dormant in the sand.

Thus, since oil is energized by the dissolved gas, through a process of compression, and since the recovery of the oil is dependent on the motive energy imparted by the dissolved gas, it is evident that efficient oil recovery is dependant on a restricted and regulated release of the pressure during the process of production.

And again, it is a demonstrated fact, borne out in practice, that by restrictively allowing gas found with the oil to escape, that not only is a greater percentage of the oil recovered, but the lighter hydro-carbons which are the qualifying and enriching parts, are prorated out to a greater percentage of the oil, thus prompting the production of a more even and better grade of oil as a whole.

In other words, there is a definite and limited amount of "gas energy" in the oil of each district, and efficient oil recovery is measured by the efficient use of this gas energy.

Important objects of the invention are to provide a device of the above mentioned character, which may be installed when the gas pressure is heavy, as the valves open up to full capacity, relieving pressure and allowing the device to be lowered to the bottom of the well to provide means to eliminate to some extent, the intermittent suction on the oil sand and regulate, stabilize and maintain a back pressure on the oil sand during the flow period of the well, to provide means for aiding and compelling the oil movement in the sand in one direction only, which direction is toward the well; to provide means for properly utilizing the gas energy associated with the oil by a more even distribution of the use of the gas energy with respect to the volume of oil raised; to provide means for effecting a more even flow of the oil, by the gas energy, eliminating agitation of the oil to a great extent; to provide means for causing the gas to exert a more efficient and continuous lifting force upon the oil; to provide means to prevent the gas energy, to some extent, when the pressure is weak, and totally if the pressure is high, from exerting more than one explosive force to the oil; to provide a device of the above mentioned character which is elastic in its adjustment and consequent regulation in the flow of oil, so that the flow may be gaged according to the constantly declining gas pressure; and to provide a device of the above mentioned character which is simple in construction, easy to install and may be removed from the well for use any number of times; to provide means for efficiently utilizing the gas energy associated with the oil, in the sand, for prompting a more complete depletion of the oil sand, by maintaining the oil energized and susceptible to recovery; to provide means for preventing collapse of casing during the gushing period of well; and to provide means of a more even proration of the gaseous hydrocarbons to the oil produced, by means of a regulated and restricted release of the gas pressure in the oil sand, during process of production.

Other objects and advantages of the invention will be apparent during the course of the following description.

In the accompanying drawings forming a part of this specification and in which like numerals are employed to designate like parts throughout the same, Figure 1 is a side elevation of a device embodying my invention, showing the same in use, with the valves open, Fig. 2 is a similar view, with the valves closed, Fig. 3 is an enlarged central longitudinal section through the device, Fig. 4 is a plan view of the same, and Fig. 5 is a horizontal section taken on line 5—5 of Fig. 3.

In the drawings, wherein for the purpose of illustration is shown a preferred embodiment of my invention, the numeral 10 designates an outer casing, extending downwardly to the cap rock.

Arranged within the lower end of the outer casing is a tubular anchor 11, extending through the cap rock into the gas sand. A tubular anchor packer 12 is arranged within the outer casing and secured to the anchor 11. The numeral 13 designates an inner tubing having a substantially smaller diameter than the outer casing 10, and arranged above the anchor packer 12.

My improved gas energy control head is arranged between the tubing 13 and the anchor packer 12, and is designated as a whole by the numeral 14. This head or device comprises a tubular body portion 15, having both ends open, the lower end being screw threaded at 16 for engagement with a coupling 17 secured to the anchor packer 12. The upper end of this tubular body portion is provided with a ground tapered valve seat 18 to engage an upwardly movable valve or ring valve 19, to form a gas tight joint therewith. The ring valve 19 is guided in its vertical movement by vertical arms 20, carrying overhanging stops 21, to limit the upward or opening movement of the ring valve 19.

A spider is arranged within the tubular body portion 15, including a tubular hub 22 and radial arms 23, these arms having screw threaded engagement with internal screw threads 24 of the tubular body portion, while its hub is internally screw threaded to engage with the screw threaded portion 25 of a tubular nipple 26. This tubular nipple is rotated to raise and lower it with relation to the tubular body portion 15. The tubular nipple 26 is rigidly connected with the tubing 13 by a coupling 27 or the like.

The numeral 28 designates an upper or inner valve, having a beveled ground face 29 to engage the inner ground face of the ring valve 19, to effect the gas tight joint therewith. The valve 28 has a central opening 30, which is smooth so that the valve is slidable upon the tubular nipple. A clamping collar 31 is carried by the screw threaded portion of the nipple and is arranged above the valve 28 to engage therewith.

The operation of the device is as follows:

When the several parts of the apparatus are suitably connected to be lowered into the casing 10, the nipple 26 is rotated counter clockwise to elevate it and the clamping collar 31, so that the ring valve 19 may move upwardly to the open position, and the inner valve 28 also move upwardly and space from the open ring valve, as clearly illustrated in Fig. 1. With both valves open, it is obvious that the oil will be free to pass through the casing 10, exteriorly of the tubing 13. The valves 19 and 28 are free to drop to the closed position, and function as automatic check valves, preventing intermittent back pressure on the well. When the flow of the oil decreases, which may be due to a decrease in gas pressure, or a decrease in the volume of oil to trap the gas pressure, the tubing 13 is turned for turning the nipple 26, which in turn will partly or wholly close the valves 19 and 28 thereby causing the oil to discharge entirely through the tubing 13.

It is to be understood that the form of my invention herewith shown and described is to be taken as a preferred example of the same, and that various changes in the shape, size and arrangement of parts may be resorted to without departing from the spirit of my invention, or the scope of the subjoined claims.

Having thus described my invention, I claim:—

1. A device of the character described, comprising a tubular body portion to be connected with the anchor packer arranged within the casing of an oil well, a movable valve to control the discharge of fluid from the upper end of the tubular body portion, a second movable valve to control the discharge of fluid from the tubular body portion and to control the opening movement of the first named valve, and a tubing leading into the tubular body portion and vertically adjustable with relation thereto and carrying an element to engage with the second named valve.

2. In a device of the character described, a tubular body portion having its upper end provided with a valve seat, a ring valve to engage the valve seat, guide members for the ring valve having stops to limit its upward movement, an inner valve arranged to engage with the ring valve and having a central opening, a tubing extending through the opening of the inner valve and entering the tubular body portion, and having an element to engage the second named valve, and means whereby the tubing may be vertically adjusted with relation to the tubular body portion.

3. In a device of the character described, a tubular body portion provided at its upper end with a valve seat, a ring valve engaging the valve seat, guide arms carried by the tubular body portion and projecting above the same and having stops, an inner valve to engage the ring valve and having a central opening, a tubing extending through the central opening of the inner valve and having a screw threaded portion, a spider arranged within the tubular body portion and engaging the screw threaded portion of the tubing, and an element carried by the tubing and arranged above the inner valve to engage therewith.

4. A device of the character described, comprising a hollow body portion having its ends open, a pressure-operated valve associated with the upper open end of said body portion, means for controlling said pressure-operated valve and coöperating with said valve to control the discharge of fluid from the hollow body portion, and means engageable with said controlling means for actuating said controlling means through its controlling movement, all as and for the purposes set forth.

5. In a device of the character described, a hollow body portion having its end open, a pressure-operated valve associated with the upper open end of said body portion, a positively operated valve for controlling the movements of said pressure-operated valve and coöperating with said pressure-operated valve to control the discharge of fluid from said body portion, and means for actuating said positively operated valve, all as and for the purposes set forth.

6. A device of the character described, comprising a hollow body portion adapted to be connected with the anchor packer arranged within the casing of an oil well, a pressure-operated valve associated with the upper end of said body portion, a positively operated valve for controlling the movements of said pressure-operated valve and coöperating with said pressure-operated valve to control the discharge of fluid from said body portion, and a movable tubing leading into the tubular body portion and adapted to impart the controlling movement to said positively operated valve.

7. In a device of the character described, a hollow body portion having its end open, a pressure-operated valve associated with the upper open end of said body portion, stop members for limiting the upward movement of said pressure-operated valve, a positively operated valve for controlling said pressure-operated valve to control the discharge of fluid from the body portion and a movable tubing leading into the tubular body portion and adjustable with respect thereto and having the collar thereon engageable with the positively operated valve to impart controlling movements thereto, all as and for the purposes set forth.

ERD V. CROWELL.